US011352755B2

(12) United States Patent
Thiesse et al.

(10) Patent No.: US 11,352,755 B2
(45) Date of Patent: Jun. 7, 2022

(54) CLEANING SYSTEM AND METHOD FOR A SPRAYING SYSTEM

(71) Applicant: Caterpillar SARL, Geneva (CH)

(72) Inventors: Chad M. Thiesse, Brooklyn Park, MN (US); Andrea Fontana, Porto Tolle-Rovido (IT)

(73) Assignee: Caterpillar SARL, Geneva (CH)

( * ) Notice: Subject to any disclaimer, the term of this patent is extended or adjusted under 35 U.S.C. 154(b) by 571 days.

(21) Appl. No.: 16/425,275

(22) Filed: May 29, 2019

(65) Prior Publication Data

US 2020/0056340 A1 Feb. 20, 2020

Related U.S. Application Data

(60) Provisional application No. 62/764,771, filed on Aug. 16, 2018.

(51) Int. Cl.
*E01H 3/04* (2006.01)
*G01F 23/00* (2022.01)
*E01C 19/17* (2006.01)
*G01F 23/80* (2022.01)

(52) U.S. Cl.
CPC ............. *E01H 3/04* (2013.01); *E01C 19/176* (2013.01); *G01F 23/0015* (2013.01); *G01F 23/80* (2022.01)

(58) Field of Classification Search
CPC ..... E01H 3/04; E01C 19/176; G01F 23/0015; G01F 23/80
USPC ........................... 404/72, 75, 84.05–111, 118
See application file for complete search history.

(56) References Cited

U.S. PATENT DOCUMENTS

| 4,695,186 | A * | 9/1987 | King | E01C 23/06 |
| | | | | 126/343.5 A |
| 10,273,640 | B1 * | 4/2019 | Boston | E01C 19/48 |
| 10,494,773 | B1 * | 12/2019 | Thiesse | B60K 15/03 |
| 2004/0240939 | A1 * | 12/2004 | Hays | E01C 19/182 |
| | | | | 404/95 |
| 2010/0258380 | A1 * | 10/2010 | Vervaet | B21B 27/10 |
| | | | | 184/6.26 |
| 2012/0219359 | A1 * | 8/2012 | Baltus | E01C 23/14 |
| | | | | 404/72 |

(Continued)

FOREIGN PATENT DOCUMENTS

| CN | 205741840 U | 11/2016 |
| JP | 2004-100146 A | 4/2004 |

*Primary Examiner* — Raymond W Addie
(74) *Attorney, Agent, or Firm* — Bookoff McAndrews PLLC

(57) ABSTRACT

A spraying system for a road construction machine includes an emulsion fluid delivery system including an emulsion fluid supply, an emulsion pump, at least one spray bar with one or more nozzles, and flow conduits arranged to convey emulsion through the emulsion fluid delivery system. The spraying system may include a cleaning fluid tank containing a cleaning fluid, where the cleaning fluid tank is fluidly coupled to the emulsion fluid delivery system during a cleaning process. The spraying system may also include a flow monitoring system configured to monitor the amount of cleaning fluid delivered from the cleaning fluid tank to the emulsion fluid delivery system, where the flow monitoring system is configured to provide an indication regarding the amount of cleaning fluid delivered to the emulsion fluid delivery system during the cleaning process.

20 Claims, 4 Drawing Sheets

(56) References Cited

U.S. PATENT DOCUMENTS

2019/0345677 A1* 11/2019 Boston ................... B05D 1/02

* cited by examiner

CLEANING SYSTEM AND METHOD FOR A SPRAYING SYSTEM

CROSS-REFERENCE TO RELATED APPLICATIONS

This application claims the benefit of priority from the U.S. Provisional Application No. 62/764,771, filed on Aug. 16, 2018, which is incorporated by reference herein in its entirety

TECHNICAL FIELD

The present disclosure relates generally to a road construction machine, and more particularly, to a system and method for cleaning delivery lines in a spraying system of a road construction machine.

BACKGROUND

The present disclosure relates to paving machines that are used in road surface construction and repairs. Paving machines are typically utilized to lay asphalt or other paving material. Paving often involves delivering (e.g., spraying) a pre-coating tack, emulsion fluid, or other treatment fluid on the ground or road surface to aid in the bonding of the new pavement. The treatment fluid may be delivered to the ground surface via a spray system that includes one or more fluid lines and spray bars coupled to the paving machine. The treatment fluid may be delivered at an elevated temperature, and may become viscous or sticky at cooler temperatures. As such, any residual amount of treatment fluid that remains in the fluid lines and spray bars at the end of a paving operation may build up and cause a blockage in the spray system, which could lead to increased maintenance or repairs.

Japanese Patent No. 2004-100146, issued to Yasuo et al. on Apr. 2, 2004 (the '146 patent), describes an emulsion spraying system that includes a supply of cleaning liquid. In the '146 patent, the supply of cleaning liquid is positioned in an engine room of the vehicle. The cleaning liquid is delivered into the emulsion circulating path. In the '146 patent, the cleaning liquid is circulated through the emulsion delivery path for a time before being discharged through a spray nozzle of the emulsion delivery system. The '146 patent discloses flushing the emulsion delivery system with a cleaning solution after a paving operation, but does not monitor the amount of cleaning fluid delivered through the emulsion delivery system. Accordingly, the cleaning system of the '146 patent runs the risk of insufficiently cleaning the emulsion delivery system. The systems and methods of the present disclosure may solve one or more of the problems set forth above and/or other problems in the art. The scope of the current disclosure, however, is defined by the attached claims, and not by the ability to solve any specific problem.

SUMMARY

In one aspect, a spraying system for a road construction machine may include an emulsion fluid delivery system including an emulsion fluid supply, an emulsion pump, at least one spray bar with one or more nozzles, and flow conduits arranged to convey emulsion through the emulsion fluid delivery system. The spraying system may include a cleaning fluid tank containing a cleaning fluid, where the cleaning fluid tank is fluidly coupled to the emulsion fluid delivery system during a cleaning process. The spraying system may also include a flow monitoring system configured to monitor the amount of cleaning fluid delivered from the cleaning fluid tank to the emulsion fluid delivery system, where the flow monitoring system is configured to provide an indication regarding the amount of cleaning fluid delivered to the emulsion fluid delivery system during the cleaning process.

In another aspect, a road construction machine may include a controller, a control panel, and an emulsion fluid delivery system. The emulsion fluid delivery system may include an emulsion tank containing a supply of emulsion fluid, an emulsion pump configured to deliver, circulate, or withdraw fluid, one or more spray bars including at least one nozzle, and a plurality of flow conduits connecting at least the emulsion pump to the spray bars to form a loop. The road construction machine may also include a cleaning fluid delivery system including a cleaning fluid tank, a flow meter, and a plurality of cleaning fluid flow conduits selectively coupled to the emulsion fluid delivery system to selectively deliver cleaning fluid from the cleaning fluid tank to the emulsion fluid delivery system during a cleaning process. The flow meter, controller, and control panel may be configured to monitor the delivery of cleaning fluid to the emulsion fluid delivery system during the cleaning process and notify a user via the control panel if less than a preset amount of cleaning fluid was delivered to the emulsion fluid delivery system during the cleaning process.

In a further aspect, a method of cleaning an emulsion fluid delivery system for a road construction machine may include delivering an amount of cleaning fluid from a cleaning fluid tank into the emulsion fluid delivery system, and circulating the cleaning fluid through the emulsion fluid delivery system using one or more pumps. The method may also include expelling the cleaning fluid from the emulsion fluid delivery system, and comparing the amount of cleaning fluid delivered into the emulsion fluid delivery system with a predetermined amount of cleaning fluid to ensure a sufficient cleaning of the emulsion fluid delivery system.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

For the purpose of this disclosure, the term "ground surface" is broadly used to refer to all types of surfaces that form typical roadways (e.g., asphalt, cement, clay, sand, dirt, etc.) or upon which paving material may be deposited in the formation of roadways. In this disclosure, relative terms, such as, for example, "about," "substantially," "generally," and "approximately" are used to indicate a possible variation of ±10% in a stated value. Although the current disclosure is described with reference to a paving machine, this is only exemplary. While the present disclosure will be discussed in connection with a paving machine, it is understood that the current disclosure can be applied as to any road construction machine. As used herein, a road construction machine includes, for example, any paver type machine, any planar type machine, any rotary mixer type machine, or any compactor type machine, including such machines that are used in the process of creating new road or surfaces, or repairing existing roads or surfaces. The current disclosure may also be used in any other machine that includes a spraying system where cleaning would be beneficial.

Figure 1:
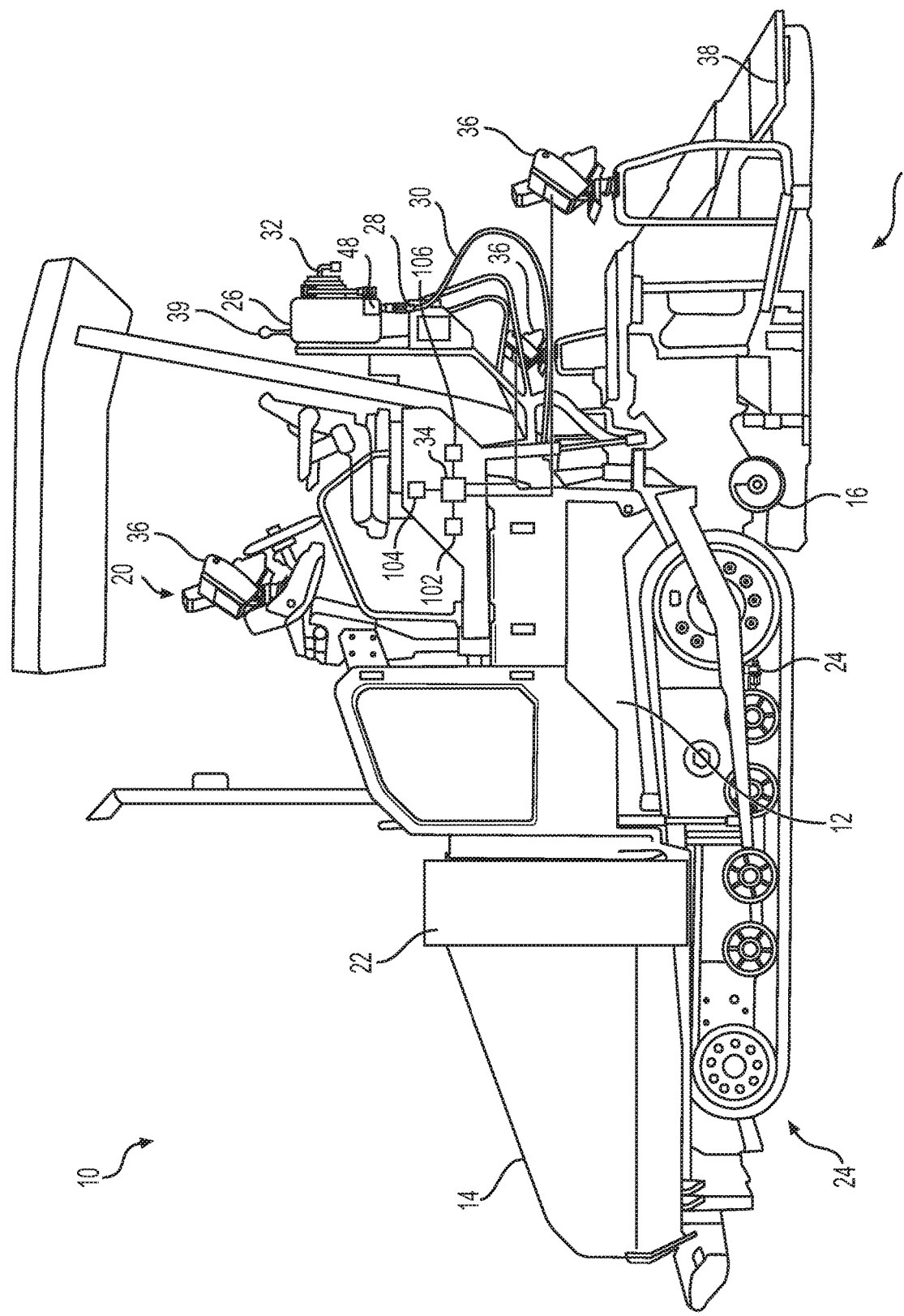
FIG. 1 is an illustration of a machine with an exemplary cleaning system, according to aspects of this disclosure.

FIG. 1 illustrates a side view of an exemplary paving machine 10, according to the present disclosure. Machine 10 may be any size paver with any paving width. In one aspect, machine 10 may be a small paver, for example, with a maximum paving width of approximately 5.5 meters. Machine 10 includes a frame 12, a hopper 14, and an auger 16. Machine 10 also includes a screed 18, which may be extendible to vary the paving width. Machine 10 may include a conveyor assembly (not shown) to deliver paving material from hopper 14 to the ground surface below auger 16. Machine 10 may also include an operator station 20, from which an operator may maneuver and control machine 10. Additionally, machine 10 includes an emulsion tank 22 and a collection of spray bars 24. Emulsion tank 22 may contain a treatment or emulsion fluid, for example, a binding material, to be delivered to the ground surface by spray bars 24, via an emulsion fluid delivery system 102, prior to delivery of the paving material via auger 16 and screed 18.

Machine 10 may include a cleaning solution tank 26 with a flow meter 28 to measure the delivery of cleaning solution through tube 30 into the internal emulsion fluid delivery system. Cleaning solution tank 26 may also include an additional outlet 32. As will be discussed in more detail below, a controller 34 may be wired or wirelessly coupled (e.g., via Bluetooth®, WiFi, or other connection protocol) to flow meter 28 and one or more control panels 36, for example, positioned in operator station 20, in one or more operator positions 38 on screed 18, or remote from machine 10. Control panels 36 may control or monitor one or more aspects of machine 10 via controller 34.

Cleaning solution tank 26 may be mounted on a rear portion of machine 10, for example, to the rear of operator station 20. Cleaning solution tank 26 may, for example, be sized to contain up to 28 liters of a cleaning fluid or cleaning solution, and may be fillable via an intake port (not shown). While this disclosure will refer to the cleaning fluid as a cleaning solution, the cleaning fluid may be any fluid that may help to dissolve, break-up, or suspend the emulsion fluid. Cleaning solution tank 26 may include a volume sensor 39. Volume sensor 39 may be a level sensor having a rod extending within cleaning solution tank 26 with a one or more resistive sensors, a floating bob, etc. to measure an amount of cleaning solution within cleaning solution tank 26. The measured amount (level, volume, etc.) may be displayed on a volume indicator coupled to volume sensor 39 and extending out of cleaning solution tank 26 and/or on control panel 36. Additionally or alternatively, cleaning solution tank 26 may include a sight glass through which an operator may observe of a level of cleaning solution within cleaning solution tank 26. Cleaning solution tank 26 may include or be fluidly coupled to one or more pumps 48 to assist in delivering cleaning solution from cleaning solution tank 26 to the emulsion fluid delivery system via tube 30 and through flow meter 28. Volume sensor 39 and one or more pumps may be wired or wirelessly coupled to controller 34, such that both volume sensor 39 and the pumps may be monitored or controlled by a user via control panel 36. Additionally, outlet 32 may be coupled to a hose to be used to spray the conveyor assembly, auger 16, screed 18, or other exterior components of machine 10 to remove the emulsion fluid. Thus, cleaning solution tank 26 may have a plurality of fluid delivery systems, including one fluid delivery system selectively coupled to the emulsion fluid delivery system, and one fluid delivery system via outlet 32 and a hose.

As noted above, flow meter 28 is positioned at an outlet of cleaning solution tank 26, e.g. downstream of the cleaning solution tank 26, but upstream of the emulsion fluid delivery system. Specifically, flow meter 28 is positioned on tube 30 that connects cleaning solution tank 26 to the internal emulsion delivery system. Flow meter 28 may be any type sensor that measures a characteristic indicating the amount of fluid flow past the sensor, as is known in the art. Flow meter 28 may include a display to indicate to a user the amount of cleaning solution that has been delivered from cleaning solution tank 26 over the course of a cleaning operation following a paving operation. Additionally, flow meter 28 may be wired or wirelessly coupled to controller 34, and the amount of cleaning solution that has been delivered from cleaning solution tank 26 may be displayed on control panel 36.

Controller 34 may include a computer or computer readable memory storing computer executable instructions to control delivery of emulsion fluid, compressed air, and cleaning solution, for example, via emulsion delivery system 102, an air delivery system 104, and a cleaning solution delivery system 106. Additionally, controller 34 may be configured to receive data from one or more sensors, for example, one or more sensors measuring the speed or direction of machine 10, pressure within the fluid lines for the delivery of emulsion fluid, compressed air, and cleaning solution. Controller 34 may further be configured to receive user commands or information from a user input device, for example, control panel(s) 36. Controller 34 may also be configured to send one or more signals or alerts to be displayed on control panel 36. The signals or alerts may also include visual or audible alerts. Controller 34 may be wired or wirelessly connected (e.g., via Bluetooth®, WiFi, or other connection protocol) to the various components of machine 10.

Figure 2:
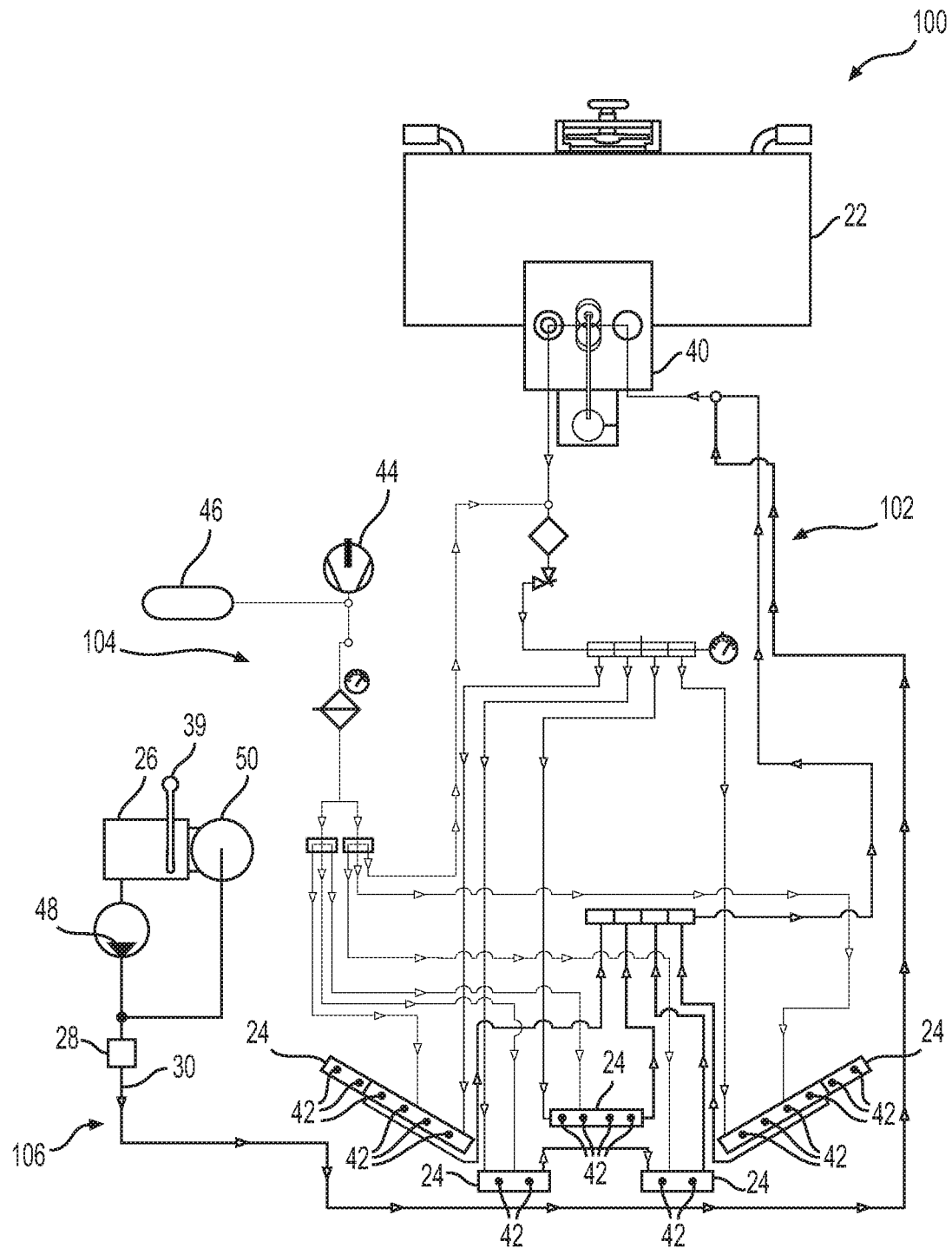
FIG. 2 is a schematic of an emulsion delivery system with the exemplary cleaning system of the machine of FIG. 1.

FIG. 2 is a schematic of a fluid delivery system 100, according to aspects of this application. Fluid delivery system 100 includes internal fluid lines or flow conduits, for example, tubes, pipes, hoses, etc. for emulsion delivery system 102, air delivery system 104, and cleaning solution delivery system 106 of machine 10. Fluid delivery system 100 may include a plurality of controllable valves (e.g. via controller 36) to control the flow of fluids within the fluid lines. Emulsion fluid delivery system 102 includes emulsion tank 22, an emulsion pump 40, one or more spray bars 24 with nozzles 42, and a plurality of associated flow conduits. Emulsion pump 40 may be a multidirectional tube pump. Emulsion pump 40 may deliver emulsion fluid from emulsion tank 22 to one or more spray bars 24. As shown, machine 10 may include a plurality of spray bars 24, which may be coupled to machine 10 in any appropriate configuration. Spray bars 24 may include one or more nozzles 42. With nozzles 42 closed, emulsion pump 40 may also circulate emulsion fluid through spray bars 24, as emulsion delivery system 102 may form one or more loops.

Air delivery system 104 of machine 10 may include an air compressor 44, an air tank 46, and associated flow conduits. Air compressor 44 may be coupled to spray bars 24. For example, nozzles 42 may be pneumatically controlled, and air delivered from air compressor 44 may open or close nozzles 42. Air compressor 44 may also be coupled to emulsion fluid delivery system 102, for example, to help deliver emulsion fluid during a paving operation or to help flush emulsion fluid or other fluids from emulsion fluid delivery system 102 and out of nozzles 42 after completion of the paving operation.

Cleaning solution delivery system 106 includes cleaning solution tank 26, a cleaning solution pump 48, volume sensor 39, flow meter 28, and associated flow conduits (e.g. tube 30). Cleaning solution delivery system 106 is coupled to emulsion solution delivery system 102 such that cleaning solution may be delivered and circulated within emulsion fluid delivery system 102, for example, via emulsion pump 40. In particular, valves of the fluid delivery system 100 may be configured by controller 34 to connect the cleaning solution delivery system 106 to an inlet of the emulsion pump 40, and the emulsion pump 40 can drive the cleaning solution through the lines of the emulsion fluid delivery system 102 to spray bars 24 and, with nozzles 42 closed, back through the recirculation lines, or, with nozzles 42 open, out of nozzles 42. After an appropriate volume of cleaning fluid has moved through the emulsion fluid delivery system 102, the valves of fluid delivery system 100 may be configured to discontinue the connection of the cleaning solution delivery system 106 with the emulsion fluid delivery system 102, and couple the air delivery system 104 to the emulsion fluid delivery system 102. The volume of cleaning fluid may be monitored and measured via one or both of volume sensor 39 and flow meter 28. The controller 34 may then actuate the air delivery system 104 to expel any cleaning solution within emulsion fluid delivery system 102, as discussed above by opening nozzles 42 and delivering compressed air. An additional cleaning solution delivery system may also include a cleaning solution hose 50, which may be used to spray cleaning solution on one or more external components of machine 10.

Controller 34 may be wired or wirelessly coupled (e.g., via Bluetooth®, WiFi, or other connection protocol) to the components of fluid delivery system 100, including components of each of emulsion fluid delivery system 102, air delivery system 104, and cleaning solution delivery system 106. As noted above, controller 34 may control a plurality of valves that control the delivery of emulsion fluid, compressed air, and cleaning solution through machine 10. Furthermore, fluid delivery system 100 may include one or more pressure sensors, which may also be coupled to controller 34 in order to help maintain appropriate pressures within the components of fluid delivery system 100.

Figure 3:
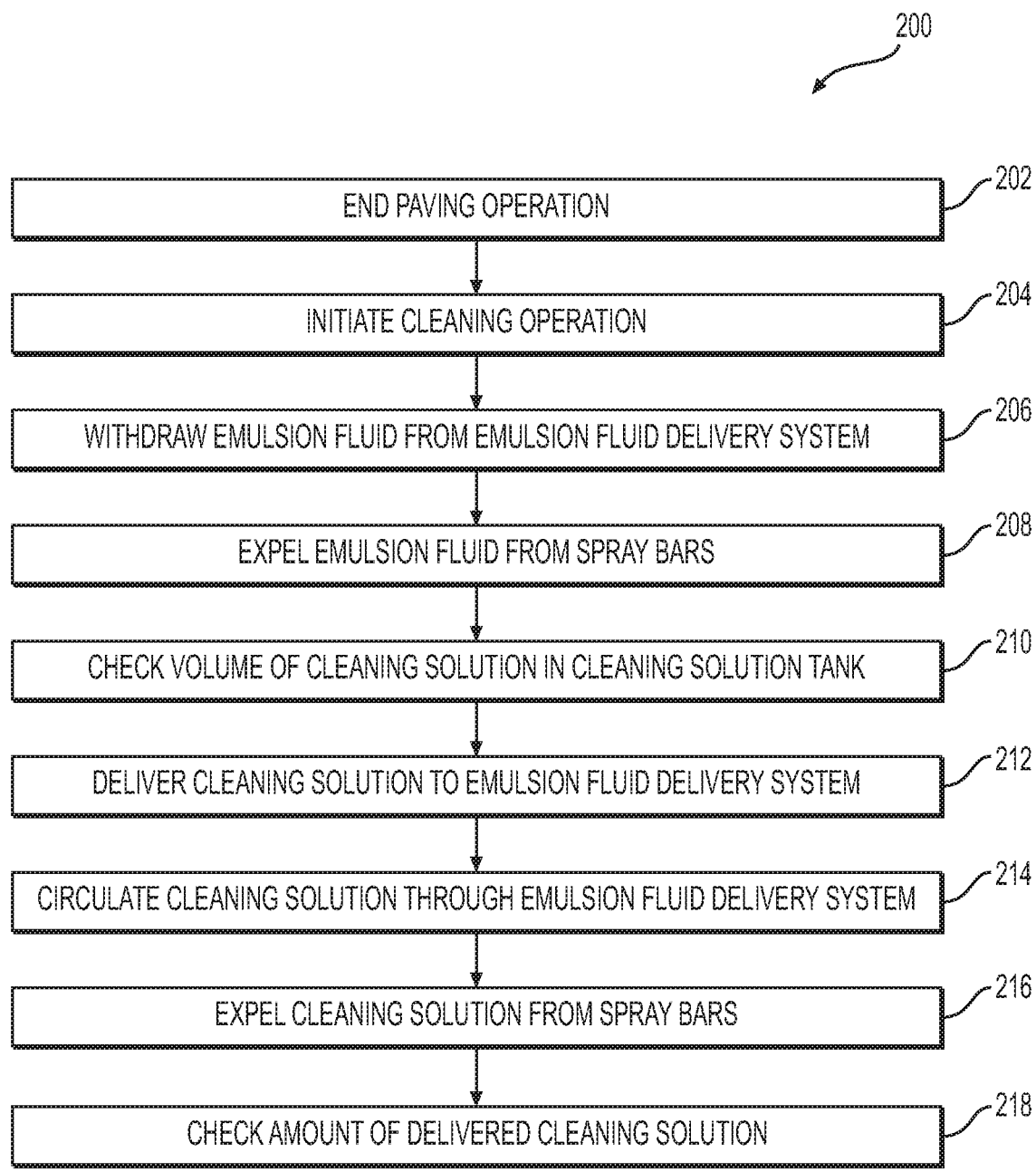
FIG. 3 provides a flowchart depicting an exemplary method for cleaning the emulsion delivery system, according to aspects of this disclosure.

FIG. 3 provides a flowchart depicting an exemplary cleaning process via method 200 for cleaning the spray system of machine 10. As discussed below with respect to FIG. 4, control panel 36 may include a user interface 300 that displays and/or controls various steps of method 200. An initial step 202 includes ending a paving operation. Step 202 may include ceasing the delivery of paving material from hopper 14 to auger 16 and screed 18, and ceasing the delivery of emulsion from emulsion fluid delivery system 102. Step 202 may also include maneuvering machine 10 to a different ground surface. Then, step 204 includes initiating a cleaning operation. Step 204 may be automatically initiated by controller 34, or may be based on user input on control panel 36. In one aspect, controller 34 may detect an end of the paving operation and may signal control panel 36 to display a prompt asking the operator if the operator would like controller 34 to initiate the cleaning operation. Once method 200 is initiated, each of the steps of method 200 may be automatically implemented, or may be initiated individually in response to user input, for example, on control panel 36.

Step 206 includes withdrawing emulsion fluid from the emulsion delivery system 102. For example, with nozzles 42 closed, controller 34 may signal emulsion pump 40 to pump any emulsion fluid from the emulsion fluid delivery system 102 back into emulsion tank 22. Next, step 208 includes expelling any remaining emulsion fluid from spray bars 24. For example, controller 34 may signal air compressor 44 to open nozzles 42 and also signal air compressor 44 to deliver compressed air through the emulsion fluid delivery system 102 to push residual emulsion fluid out of the open nozzles 42.

Step 210 includes checking a volume of cleaning solution in cleaning solution tank 26. The volume sensor 39 in cleaning solution tank 26 may be in communication with control panel 36 such that a measured volume may be displayed on control panel 36. In another aspect, volume sensor 39 may send an indication, e.g., an alarm signal, to be displayed on control panel 36. For example, if volume sensor 39 measures an amount of cleaning solution that is insufficient to properly clean the lines of emulsion fluid delivery system 102 (e.g. an amount that is less than what is required for a preset duration of the cleaning process), an alert may be visually displayed on cleaning solution tank 26, on volume sensor 39, or on control panel 36, audibly signaled, or otherwise indicated to the user. Step 210 may halt the process 200 until the solution tank 26 has sufficient cleaning solution, and/or step 210 may include a user override option to continue process 200 even though the cleaning solution tank 26 is not sufficiently full to complete the cleaning process 200.

Step 212 includes delivering cleaning solution from cleaning solution tank 26 into emulsion fluid delivery system 102. For example, cleaning solution pump 48 within cleaning solution tank 26 may pump cleaning solution through flow meter 28 and tube 30. As such, cleaning solution may be input into the lines of emulsion fluid delivery system 102 to help dissolve, break-up, or suspend any residual emulsion fluid or other material within the lines of emulsion fluid delivery system 102. Cleaning solution pump 48 may deliver cleaning solution for a preset amount of time, which may correspond to a preset volume of cleaning solution. The volume of delivered cleaning solution may be measured and monitored by flow meter 28 and volume sensor 39.

Step 214 includes circulating the cleaning solution through emulsion fluid delivery system 102. For example, emulsion pump 40 may cycle the cleaning solution within the lines of emulsion fluid delivery system 102, which may help to further dissolve, break-up, or suspend the emulsion fluid within the lines. The circulation may be conducted for a preset number of cycles, a preset amount of time, etc. Next, step 216 includes expelling the cleaning solution from the one or more spray bars 24. For example, controller 34 may signal air delivery system 104 to deliver air to the pneumatic valves to open nozzles 42, and controller 34 may also open one or more valves between air delivery system 104 and emulsion fluid delivery system 102 such that air compressor 44 may deliver compressed air to help push the cleaning solution and the residual emulsion fluid out of nozzles 42. Steps 208 through 216 of method 200 may be repeated as many times as appropriate to thoroughly cleanse emulsion fluid delivery system 102.

Step 218 includes checking an amount of delivered cleaning solution via a flow monitoring system including volume sensor 39, flow meter 28, controller 34, and control panel(s) 36. For example, volume sensor 39 may measure an initial amount of cleaning solution and a final amount of cleaning solution, and controller 34 may determine an amount of cleaning solution that has been removed from cleaning solution tank 26. Additionally, flow meter 28 monitors the amount of cleaning solution that is delivered from cleaning solution tank 26 into emulsion fluid delivery system 102. Flow meter 28 may indicate the amount of cleaning solution that has been delivered to emulsion fluid delivery system 102. Furthermore, flow meter 28 may transmit information regarding the amount of delivered cleaning fluid to controller 34, and controller 34 may compare the flow meter information with the amount of removed cleaning solution based on the measurements of volume sensor 39. In one aspect, the amounts of cleaning solution measured by flow meter 28 and by volume sensor 39 may be approximately the same. In other aspect, for example, if emulsion fluid is sprayed with cleaning solution hose 50 during method 200, the amount of cleaning solution measured by flow meter 28 is a more accurate measurement of the emulsion fluid delivered to emulsion fluid delivery system 102 than the change in amount of cleaning solution measured by volume sensor 39.

Controller 34 may provide an indication of the amount of delivered cleaning fluid, e.g., a signal to control panel 36 to display the amount of delivered cleaning fluid on control panel 36. Controller 34 may also compare the amount of delivered cleaning fluid to a user input, pre-set, or pre-programmed amount of cleaning fluid corresponding to an amount of cleaning fluid necessary to yield a sufficient cleaning of emulsion fluid delivery system 102. Additionally or alternatively, the amount of cleaning fluid necessary to produce a sufficient cleaning may correspond to a paving operation that was previously completed. For example, a necessary amount of cleaning solution could be selected based on a length of the paving operation just completed, whereas a longer paving operation may require a greater amount of cleaning solution to properly clean the emulsion fluid delivery system 102. For example, controller 34 may track the duration of the paving operation, and may adjust the required amount of cleaning solution necessary to properly clean the emulsion fluid delivery system 102.

Step 218 may include the operator checking the measurement of the delivered cleaning solution. Flow meter 28 and/or volume sensor 39 may include a display on flow meter 28 and/or volume sensor 39 itself, such as a mechanical dial or electronic display that visually indicates the amount of delivered cleaning solution. The amount of delivered cleaning solution may also be displayed on control panel 36. Furthermore, if an insufficient amount of cleaning solution was delivered, controller 34 may provide an indication, such as a signal to control panel 36 to display an alert or notification (e.g., bright red text or flashing alert). The alert or notification may also be accompanied by one or more additional visual or audible alerts such that the operator is aware that an insufficient amount of cleaning solution has been delivered to emulsion fluid delivery system 102. Furthermore, during any step of method 200, the operator may use a different fluid delivery system coupled to cleaning solution tank 26, such as cleaning solution hose 50 coupled to outlet 32 to spray the cleaning solution on auger 16, screed 18, or other components of machine 10 to help remove the emulsion fluid delivered during the paving operation. Because flow meter 28 is located to only measure cleaning solution flow to the emulsion fluid delivery system 102, rather than the total cleaning solution extracted from cleaning solution tank 26, any cleaning solution sprayed by cleaning solution hose 50 does not affect the determinations by controller 34 as to whether an adequate amount of cleaning solution has been delivered to clean emulsion fluid delivery system 102.

Figure 4:
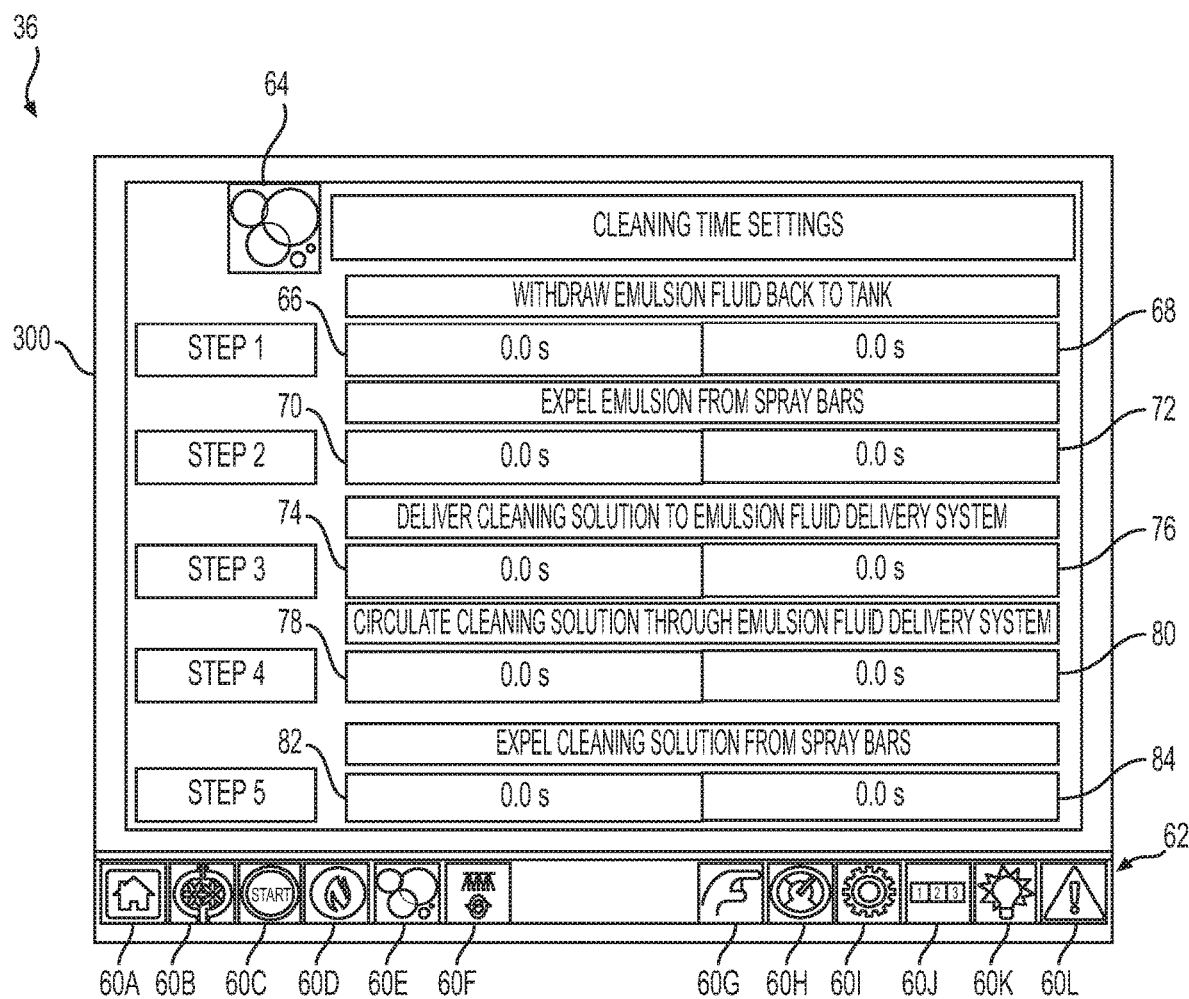
FIG. 4 is an illustration of an exemplary display interface of the exemplary machine of FIG. 1.

FIG. 4 illustrates an exemplary user interface 300 that may be displayed on control panel 36. User interface 300 may include a plurality of switches, buttons, keyboards, etc., or may include a touch screen user interface (e.g., an iPad®, tablet, etc.). One or more control panels 36 may be positioned on machine 10 or may be remote from machine 10, for example, a smartphone, tablet, or laptop. In either aspect, one or more control panels 36 are wired or wirelessly connected to controller 34. Control panel 36 may be operable to control the operation of machine 10, including the delivery of emulsion fluid, the cleaning steps of method 200, etc.

Control panel 36 may include a plurality of display screens on user interface 300, and the display screens may be selectable via a plurality of tabs 60A-60L on a tool bar 62. For example, tool bar 62 may include a home tab 62A and a variety of other tabs 60B-60L to allow a user to toggle between a variety of other input and/or monitoring screens, which may include accessing corresponding settings or actuation control screens. FIG. 4 illustrates control panel 36 being in a cleaning time settings mode or screen, for example, with tab 60E being active and the corresponding icon 64 being displayed on user interface 300. Cleaning time settings mode may be automatically displayed on user interface 300 after a paving operation has been completed, or may be user selected via tab 60E.

Cleaning time settings mode may include a plurality of user adjustable durations, for example, for various steps of method 200. Cleaning time settings mode may also include a plurality of displays that allow a user to track the progress of the various steps of method 200. For example, when in cleaning time settings mode, a operator may track the duration of various steps of method 200.

As shown in FIG. 4, cleaning time settings mode may include settable times and elapsed times for withdrawing emulsion fluid from emulsion fluid delivery system in step 206, expelling emulsion fluid from spray bars in step 208, delivering cleaning solution to emulsion fluid delivery system in step 212, circulating cleaning solution through emulsion fluid delivery system in step 214, and expelling cleaning solution from spray bars in step 216. In one aspect, cleaning time settings mode may include displaying a set duration and an elapsed duration for each of these steps. For example, an emulsion withdraw set duration 66 may indicate a set duration for step 206, and an emulsion withdraw elapsed duration 68 may indicate an elapsed duration of step 206. An expel emulsion set duration 70 may indicate a set duration for step 208, and an expel emulsion elapsed duration 72 may indicate an elapsed duration of step 208. A deliver cleaning solution set duration 74 may indicate a set duration for step 212, and a deliver cleaning solution elapsed duration 76 may indicate an elapsed duration of step 212. Alternatively or additionally, user interface 300 may display a preset or user-input volume of cleaning solution to be delivered and a volume of cleaning solution that has been delivered, which may be based on information from one or more of flow meter 28 or volume sensor 39. A circulate cleaning solution set duration 78 may indicate a set duration for step 214, and a circulate cleaning solution elapsed duration 80 may indicate an elapsed duration of step 214. Lastly, an expel cleaning solution set duration 82 may indicate a set duration for step 216, and an expel cleaning solution elapsed duration 84 may indicate an elapsed duration of step 216.

Selecting one of the timed method steps (i.e., Step 1, Step 2, Step 3, Step 4, or Step 5 in FIG. 4) within the cleaning time settings mode may allow the user to adjust the set duration for the respective method step, for example, by displaying up or down arrows and/or a keypad for the user to input or adjust the set duration. Additionally, user interface 300 may include one or more indicators to indicate which step is currently active. For example, the method step may be illuminated, or an arrow or other indication may signal to the user which step in method 200 is currently being carried out.

In one aspect, controller 34 may automatically switch between steps of method 200, for example, by initiating step 214 after the elapsed duration 80 for circulating cleaning solution through emulsion fluid delivery system in step 212 reaches the set duration 78. Alternatively, controller 34 may signal user interface 300 to display a notification to the user that step 212 is complete and provide for the user to initiate step 214. While steps 206, 208, 212, 216, and 218 are discussed above, this disclosure is not so limited, as cleaning time settings mode may include additional displays or user inputs to track or otherwise ensure method 200 is performed appropriately.

It is noted that that at any stage of method 200, controller 34 may signal control panel 36 to display an alert that a portion of method 200 has not been properly performed. For example, controller 34 may detect and signal that, based on information from volume sensor 39, cleaning solution tank 26 does not contain a sufficient volume of cleaning solution to perform method 200. In another aspect, controller 34 may detect and signal that flow meter 28 has not measured a sufficient amount of cleaning solution being delivered to emulsion fluid delivery system 102, or that the circulating of step 214 has not been performed for set duration 78. The alert may both be visually displayed on flow meter 28 and via user interface 300 on control panel 36, and also may coincide with an additional audible alarm (siren, buzzer, etc.) and/or an additional visual alarm (e.g., a flashing light).

INDUSTRIAL APPLICABILITY

The disclosed aspects of machine 10 may be used in any spraying system to help ensure a proper cleaning of the system, such as an emulsion fluid delivery system 102. During operation, machine 10 may deliver emulsion fluid from emulsion tank 22 through emulsion fluid delivery system 102 and out of nozzles 42 on spray bars 24. The emulsion fluid may aid in the binding of the paving material to the ground surface. However, at the end of the paving operation, it is important to clear the emulsion fluid out of the delivery lines, spray bars 24, and nozzles 42 because the emulsion fluid may cool or dry to solidify and obstruct the delivery lines, spray bars 24, and nozzles 42 for a later paving operation. The disclosed aspects of machine 10 may be used to help ensure that the delivery lines, spray bars 24, and nozzles 42 have been properly cleaned of any residual emulsion fluid.

For example, after performing a paving operation, the user may select the cleaning time settings mode on user interface 300, which may prompt machine 10 and controller 34 to perform method 200. In one aspect, user interface 300 may prompt the user to set the various durations (or an amount of cleaning solution) for the steps of method 200. In another aspect, controller 34 may automatically begin performing method 200. In either aspect, withdrawing emulsion fluid from emulsion fluid delivery system 102 with emulsion pump 40 and then expelling emulsion fluid from nozzles 42 by injecting compressed air from air compressor 44 may help to reduce the amount of residual emulsion fluid within emulsion fluid delivery system 102. Performing steps 206 and 208 for longer periods of time may help reduce the amount of residual emulsion fluid, but performing steps 206 and 208 for too long may put undue stress on the delivery lines of emulsion fluid delivery system 102, and may also allow any emulsion fluid within emulsion fluid delivery system 102 to cool, dry, harden, or otherwise become stuck in the delivery lines. Therefore, it is also important to perform steps 212 through 216 shortly after the end of the paving operation. Furthermore, performing step 210 and checking the amount of cleaning solution in cleaning solution tank 26 via volume sensor 39 may help to ensure that a sufficient amount of cleaning solution is available to adequately clean emulsion fluid delivery system 102, for example, for deliver cleaning solution set duration 74 and/or the set volume. Additionally, ensuring that there is a sufficient amount of cleaning solution in cleaning solution tank 26 may help to prevent damage to cleaning solution pump 48 by operating under dry conditions when cleaning solution tank 26 is empty. Controller 34 may prevent or pause method 200 if there is an insufficient amount of cleaning solution.

Delivering the cleaning solution in step 212 shortly after the paving operation may help to prevent emulsion fluid from cooling, hardening, or otherwise becoming stuck. Additionally, circulating the cleaning solution with emulsion pump 40 in step 214 may help to further dissolve, break-up, or suspend the emulsion fluid. Expelling the cleaning solution, with any residual emulsion fluid suspended in the cleaning solution in step 216, via compressed air may help to ensure that the delivery lines of emulsion fluid delivery system 102 are clear of any remaining fluid. Lastly, step 218, which may be performed by flow meter 28 and/or controller 34 based on information from flow meter 28 and/or volume sensor 39, and may also be displayed on flow meter 28 and/or user interface 300, may help to ensure that a sufficient amount of cleaning solution was delivered to emulsion fluid delivery system 102. Flow meter 28 is positioned between cleaning solution tank 26 and emulsion fluid delivery system 102, which ensures that only cleaning fluid delivered to emulsion fluid delivery system 102, and not, for example, removed from cleaning solution tank 26 via outlet 32 or cleaning solution hose 50, is used to determined whether a sufficient amount of cleaning solution has been delivered. Furthermore, one or more of flow meter 28 or volume sensor 39 may help to detect or indicate a blockage in fluid delivery system 100 which may stop or hinder the delivery of cleaning solution from cleaning solution tank 26, even if cleaning solution pump 48 is operating and cleaning solution tank 26 is full.

If at step 210 there is an insufficient amount of cleaning solution in cleaning solution tank 26 as measured by volume sensor 39, a notification may be displayed, for example, on cleaning solution tank 26 or on user interface 300. Controller 34 may pause method 200 until such time as a user fills cleaning solution tank 26 with a sufficient volume of cleaning solution. Moreover, if at step 218 an insufficient amount of cleaning solution has been delivered, controller 34 may display a prompt on user interface 300 to repeat steps 212 to 216. Alternatively, if at step 218 an insufficient amount of cleaning solution has been delivered, controller 34 may automatically signal the components of machine 10 to repeat steps 212 to 216. Therefore, the systems and methods discussed herein may help to ensure that emulsion fluid delivery system 102 has been properly cleaned after spraying emulsion fluid on a ground surface during an paving operation.

It will be apparent to those skilled in the art that various modifications and variations can be made to the disclosed machine without departing from the scope of the disclosure. Other embodiments of the machine will be apparent to those skilled in the art from consideration of the specification and practice of the cleaning systems and methods for a spraying machine disclosed herein. It is intended that the specification and examples be considered as exemplary only, with a true scope of the disclosure being indicated by the following claims and their equivalents.

What is claimed is:

1. A spraying system for a road construction machine, comprising:
    an emulsion fluid delivery system including an emulsion fluid supply, an emulsion pump, at least one spray bar with one or more nozzles, and flow conduits arranged to convey emulsion through the emulsion fluid delivery system;
    a cleaning fluid tank containing a cleaning fluid, wherein the cleaning fluid tank is fluidly coupled to the emulsion fluid delivery system during a cleaning process; and
    a flow monitoring system configured to monitor the amount of cleaning fluid delivered from the cleaning fluid tank to the emulsion fluid delivery system, wherein the flow monitoring system is configured to provide an indication regarding the amount of cleaning fluid delivered to the emulsion fluid delivery system during the cleaning process.

2. The spraying system of claim 1, wherein the flow monitoring system includes a flow meter located downstream from the cleaning fluid tank and upstream of the emulsion fluid delivery system.

3. The spraying system of claim 2, wherein the cleaning fluid tank supplies cleaning fluid to a plurality of fluid delivery systems, and the flow meter only measures flow to the emulsion fluid delivery system.

4. The spraying system of claim 2, wherein the flow monitoring system includes a controller coupled to the flow meter and configured to compare the amount of cleaning fluid delivered to the emulsion fluid delivery system to a preset amount of cleaning fluid.

5. The spraying system of claim 4, wherein the indication includes a signal to a user if the amount of cleaning fluid delivered to the emulsion fluid delivery system is less than the preset amount of cleaning fluid.

6. The spraying system of claim 5, wherein the flow monitoring system further includes a control panel, wherein the controller is coupled to the control panel to provide the signal to the user.

7. The spraying system of claim 6, wherein the control panel is configured to receive one or more user inputs to adjust or set the preset amount of cleaning fluid.

8. The spraying system of claim 1, wherein the emulsion pump is configured to deliver cleaning fluid to the emulsion fluid delivery system.

9. The spraying system of claim 8, wherein the emulsion pump is configured to withdraw emulsion fluid from within delivery lines into the emulsion fluid tank.

10. The spraying system of claim 1, wherein the flow monitoring system further includes a level sensor associated with the cleaning fluid tank, and the flow monitoring system is configured to provide another indication when there is insufficient cleaning fluid to complete the cleaning process.

11. A road construction machine, comprising:
    a controller;
    a control panel;
    an emulsion fluid delivery system including
        an emulsion tank containing a supply of emulsion fluid,
        an emulsion pump configured to deliver, circulate, or withdraw fluid,
        one or more spray bars including at least one nozzle; and
        a plurality of flow conduits connecting at least the emulsion pump to the spray bars to form a loop; and
    a cleaning fluid delivery system including
        a cleaning fluid tank,
        a flow meter, and
        a plurality of cleaning fluid flow conduits selectively coupled to the emulsion fluid delivery system to selectively deliver cleaning fluid from the cleaning fluid tank to the emulsion fluid delivery system during a cleaning process;
    wherein the flow meter, controller, and control panel are configured to monitor the delivery of cleaning fluid to the emulsion fluid delivery system during the cleaning process and notify a user via the control panel if less than a preset amount of cleaning fluid was delivered to the emulsion fluid delivery system during the cleaning process.

12. The spraying system of claim 11, wherein the flow meter is located downstream from the cleaning fluid tank and upstream of the emulsion fluid delivery system.

13. The spraying system of claim 12, wherein the control panel is configured to receive one or more user inputs to adjust or set the preset amount of cleaning fluid.

14. The control system of claim 13, wherein the cleaning process includes a plurality of steps, and the control panel displays the duration of the plurality of steps.

15. The control system of claim 14, wherein the control panel allows user input for a preset duration of the plurality of steps.

16. The control system of claim 15, wherein the plurality of steps of the cleaning process includes checking the amount of cleaning fluid in the cleaning fluid tank to ensure that enough cleaning fluid is in the cleaning fluid tank to complete the cleaning process.

17. A method of cleaning an emulsion fluid delivery system for a road construction machine, comprising:
    delivering an amount of cleaning fluid from a cleaning fluid tank into the emulsion fluid delivery system;
    circulating the cleaning fluid through the emulsion fluid delivery system using one or more pumps;
    expelling the cleaning fluid from the emulsion fluid delivery system; and
    comparing the amount of cleaning fluid delivered into the emulsion fluid delivery system with a predetermined amount of cleaning fluid to ensure a sufficient cleaning of the emulsion fluid delivery system.

18. The method of claim 16, wherein the method is automatically initiated by a controller on the spraying machine after a spraying operation has ended.

19. The method of claim 16, further including checking an amount of cleaning fluid in the cleaning fluid tank, and pausing the delivering the cleaning fluid to the emulsion fluid delivery system if the amount is insufficient to provide a preset cleaning duration.

20. The method of claim 16, wherein the comparing the amount of cleaning fluid delivered into the emulsion fluid delivery system is performed by a flow meter positioned between the cleaning fluid tank and the emulsion fluid delivery system, and wherein the flow meter includes one or more indicators to visually or audibly indicate whether the delivered amount of cleaning fluid is less than the predetermined amount of cleaning fluid.

\* \* \* \* \*